United States Patent [19]

Nakashima et al.

[11] Patent Number: 4,551,174
[45] Date of Patent: Nov. 5, 1985

[54] METHOD OF REFINING MOLTEN STEEL BY ARC PROCESS

[75] Inventors: Hirohisa Nakashima; Yoshimi Komatsu; Masafumi Ikeda; Tsuneo Kondo, all of Fukuyama, Japan

[73] Assignee: Nippon Kokan Kabushiki Kaisha, Tokyo, Japan

[21] Appl. No.: 674,566

[22] Filed: Nov. 26, 1984

[30] Foreign Application Priority Data

Sep. 3, 1984 [JP] Japan ............... 59-184155
Sep. 28, 1984 [JP] Japan ............... 59-1471118[U]
Sep. 28, 1984 [JP] Japan ............... 59-203636
Sep. 28, 1984 [JP] Japan ............... 59-203637
Sep. 28, 1984 [JP] Japan ............... 59-203638

[51] Int. Cl.$^4$ ............................... C21C 5/52
[52] U.S. Cl. ............................. 75/12; 75/10 R
[58] Field of Search .................... 75/12, 11, 10

[56] References Cited

U.S. PATENT DOCUMENTS 3,708,599  1/1973  Krause ............... 75/12
4,308,415 12/1981  Hasegawa ........... 75/12
4,362,556 12/1982  Kishida .............. 75/58

Primary Examiner—Peter D. Rosenberg
Attorney, Agent, or Firm—Frishauf, Holtz, Goodman & Woodward

[57] ABSTRACT

Nondeoxidized molten steel is removed from a steel converter and poured into a ladle. Carbon electrodes are submerged in a slag layer on the molten steel and are separated by a predetermined distance from the molten steel. The electrodes are energized to generate arcs with the molten steel. Argon gas is blown into the molten steel through a lance submerged in the molten steel to stir the molten steel with the gas. The molten steel is arc-heated and at the same time stirred. Carbon in the molten steel reacts with residual unstable oxygen in the steel to deoxidize the molten steel. The molten steel is also decarburized, thereby preventing an increase in carbon content of the molten steel in the arc process.

17 Claims, 17 Drawing Figures

METHOD OF REFINING MOLTEN STEEL BY ARC PROCESS

BACKGROUND OF THE INVENTION

The present invention relates to a method of refining molten steel such that electrodes are submerged in a slag layer of the molten steel and generate arcs within the slag to refine the molten steel in accordance with the submerged arc heating method.

If molten steel is refined in a steel converter and is then arc-heated by arc heating process, the temperature of molten steel flowing out of the steel converter can be decreased. Therefore, losses of additives and consumption of refractory material of the converter can be decreased and the yield of the molten steel from the converter can be increased. In practice, when the arc process is performed, carbon electrodes 6 are preferably submerged in a slag 4 on the molten steel 2, and an arc is generated between the electrodes 6 and the molten steel 2 while the electrodes 6 are substantially surrounded with the slag 4 (namely submerged arc heating), as shown in FIG. 1. When the slag 4 is not present, an arc jumps between the electrodes and the ladle furnace wall or between the electrodes and a gas blow lance, so that the refractory materials are locally damaged. In addition, the refractory furnace wall is heated by heat radiated from an arc column. In general, the thickness of the slag layer is set to 1+50 mm, where 50 mm is a margin and 1 is given as follows:

$$l = (V_2/\sqrt{3}) \times a - K - I_2 \cdot R, \quad (1)$$

where $V_2$ and $I_2$: the secondary line-to-line voltage and the secondary current
$a$: the power factor
$K$: the potential difference (40 V) between the anode and cathode
$R$: the circuit resistance In general, Ar gas is introduced into the molten steel to stir the molten steel so as to keep the molten steel and the slag at a uniform temperature in the arc process. By stirring, the surface of the molten steel is undulated bringing the molten steel into contact with the electrode, thereby damaging the electrode. In addition, carbon from the electrode enters the molten steel directly or through the slag. As a result, the carbon content [C] of the molten steel is increased.

FIG. 2 shows the relationship between the slag thickness and increase speed of the carbon content [C] when 250 tons of molten steel is heated for one heat or charge at a heating rate of 4° to 5° C./min. When the slag thickness and the arc length are increased, the increase speed of the carbon content [C] can be decreased. However, as apparent from the graph in FIG. 2, even if the slag thickness is increased, an increase in the carbon content [C] cannot be completely prevented. In addition, the amount of flux used and the amount of power consumed are increased, resulting in inconvenience.

For example, when the slag thickness is 100 mm, the carbon content of the molten steel is increased by 0.005% when arc heating is performed for 10 minutes. When such a change in carbon content occurs, the control of the carbon content in a low-carbon steel is difficult. For this reason, in low-carbon steel, especially, in ultra-low-carbon steel having a carbon content of less than 0.015%, the arc process is not conventionally utilized. When low-carbon steel is subjected to RH degassing, the temperature of molten steel flowing out of a steel converter must be not less than, e.g., 1,700° C. Various problems are presented since this temperature is very high.

When molten steel is heated by the arc process, the time for the arc process must be changed in accordance with the end of the refinement of the molten steel by the converter and the commencement of the continuous casting. However, according to the conventional steel heating technique, the heating rate is not considered, so a sufficient and complete match with other processes cannot always be established.

In order to prevent the slag on the molten steel from being excessively heated and to keep the molten steel and slag at a predetermined temperature when the molten steel is arc-heated, a gas is introduced into the molten steel to stir the steel together with the slag. In this manner, the slag must be prevented from being heated to a high temperature. However, in this case, the molten steel is often brought into contact with the electrode due to the undulation of the steel by the introduction of gas. When this occurs, the arc becomes unstable and the electrode is excessively worn. Carbon is picked up from the carbon electrode by the molten steel. When the molten steel is desulfurized during the arc process, the molten steel and the slag are stirred after arc heating is performed so that the slag reacts with the molten steel to desulfurize the molten steel. In this case, the molten steel and the slag must be vigorously stirred. However, according to this conventional stirring method, satisfactory results cannot always be obtained.

SUMMARY OF THE INVENTION

It is an object of the present invention to provide a method of refining molten steel by an arc process, wherein the molten steel can be arc-heated without increasing carbon content, so that the temperature of ultra low carbon molten steel, such as molten steel to be RH-decarburized, can be decreased when it is poured from a converter to a ladle for arc heating.

According to the present invention, there is provided a method of refining molten steel by an arc process comprising the steps of: flowing an oxidized and refined molten steel into a ladle at a temperature not higher than 1,650° C.; energizing an electrode submerged in a slag on a nondeoxidized molten steel and separated from the nondeoxidized molten steel and generating an arc between the electrode and the nondeoxidized molten steel, thereby arc-heating the nondeoxidized molten steel; introducing a gas in the molten steel to stir the molten steel through a lance submerged therein, thereby accelerating a chemical reaction between oxygen and carbon in the molten steel.

According to the present invention, since the carbon content of the molten steel does not increase during a arc process, the low-carbon steel can be subjected to arc heating in the same manner as for normal steel materials. For example, an ultra low carbon steel to be subjected to RH-decarburization can be arc-heated. Unlike the conventional case, the end temperature of the ultra low carbon steel in a converter can be decreased below 1,650° C. In addition, the losses of additives and the consumption of the refractory material of the converter can be decreased, and the yield of the molten steel flowing out of the converter can be increased. As a result, refinement cost can be greatly decreased. In addition, unlike the conventional case wherein the molten steel flows from the converter at a high temperature, the molten steel can flow from the converter at a low temperature, and the nitrogen content in the molten steel will not be increased since reheating is not required. Therefore, the quality of the resultant steel products can be stabilized.

DETAILED DESCRIPTION OF THE PREFERRED EMBODIMENTS

Figure 1:
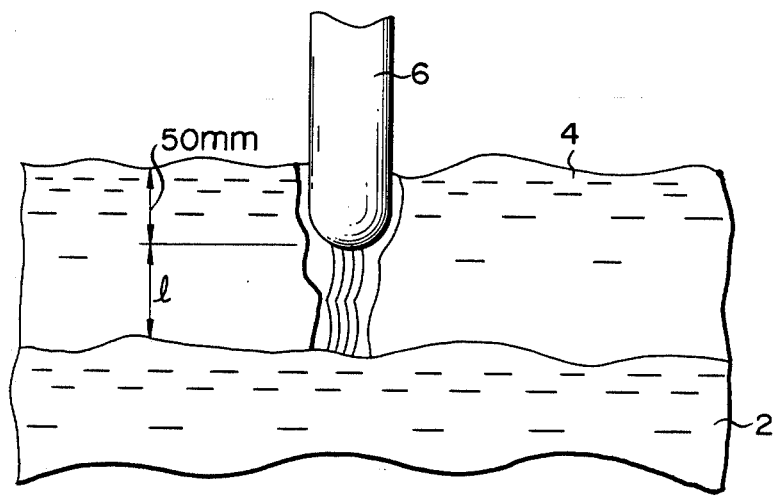
FIG. 1 is a sectional view for explaining submerged arc heating.
Figure 2:
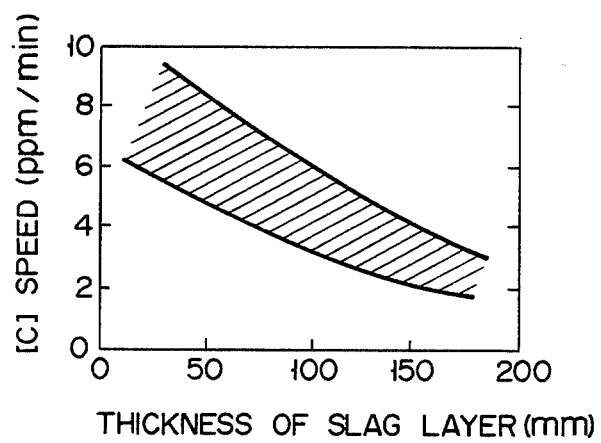
FIG. 2 is a graph for explaining the relationship between the carbon content [C] and the slag thickness.
Figure 3:
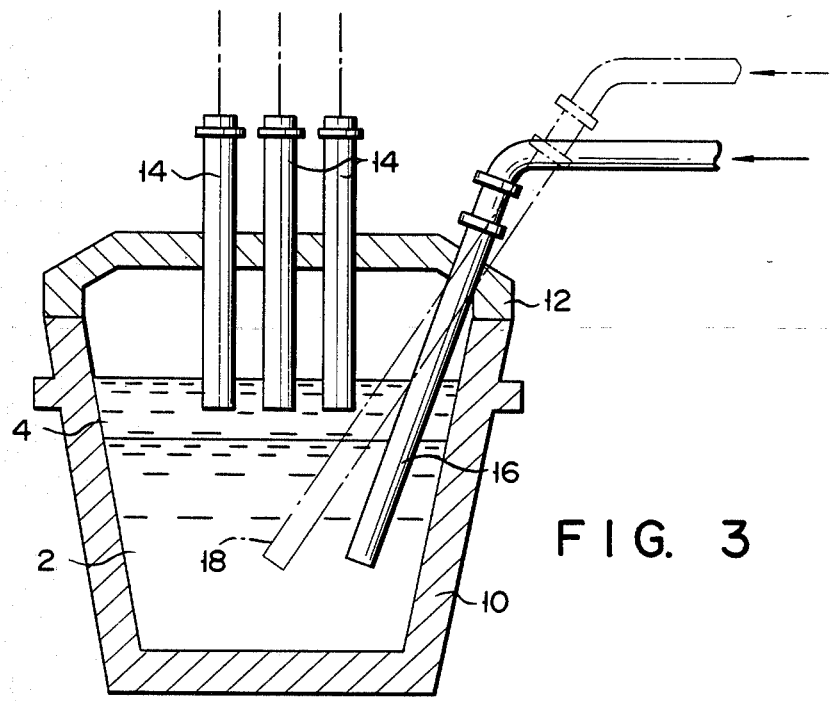
FIG. 3 is a longitudinal sectional view of a ladle refining furnace used in the present invention.

FIG. 3 is a longitudinal sectional view of a ladle refining furnace used in the present invention. Molten steel 2 refined by oxygen gas blowing in a converter (not shown) flows to a ladle 10 without deoxidation. A flux is added to the molten steel in the ladle, and a cover 12 is placed on the ladle 10. Ar gas is supplied to the ladle 10 to keep the inner space of the ladle in an inert gas atmosphere. Carbon electrodes 14 and a gas blow lance 16 are inserted into the ladle through corresponding holes formed in the cover 12. The electrodes 14 are inserted such that their longitudinal direction corresponds to the vertical direction. The lance 16 is submerged in the molten steel 2 at a slightly inclined angle. The electrodes 14 are separated from the nondeoxidized molten steel 2 by a predetermined arc gap, thereby generating arcs. By this arc heating, the flux is melted so a layer of a molten slag 4 is formed on the molten steel. In this case, the amount of flux is adjusted such that the slag layer has a thickness sufficient to submerge the electrodes at a depth of about 50 mm in the slag layer.

While the molten steel is arc-heated, Ar gas is introduced into the molten steel through the submerged lance 16, thereby stirring the molten steel. After the molten steel is arc-heated in this manner, arc heating is stopped, and the electrodes 14 and the lance 16 are moved upward. Thereafter, aluminum (Al), manganese (Mn), silicon (Si) and the like are inserted into the molten steel to perform deoxidization. In addition, manganese (Mn) and the like are further added to the molten steel to adjust its composition. A vigorously stirring lance 18 is inserted into the ladle 10 and is submerged in the molten steel. Ar gas is supplied to the molten steel at a higher rate than during arc heating, thereby vigorously stirring the molten steel. The arc-heated molten steel is moved to RH-decarburization equipment to decarburize the molten steel in a vacuum state. In this manner, the molten steel is arc-heated after removal from the steel converter, so that the temperature of the molten steel flowing out of the converter can be decreased to less than 1,650° C.

Figure 4:
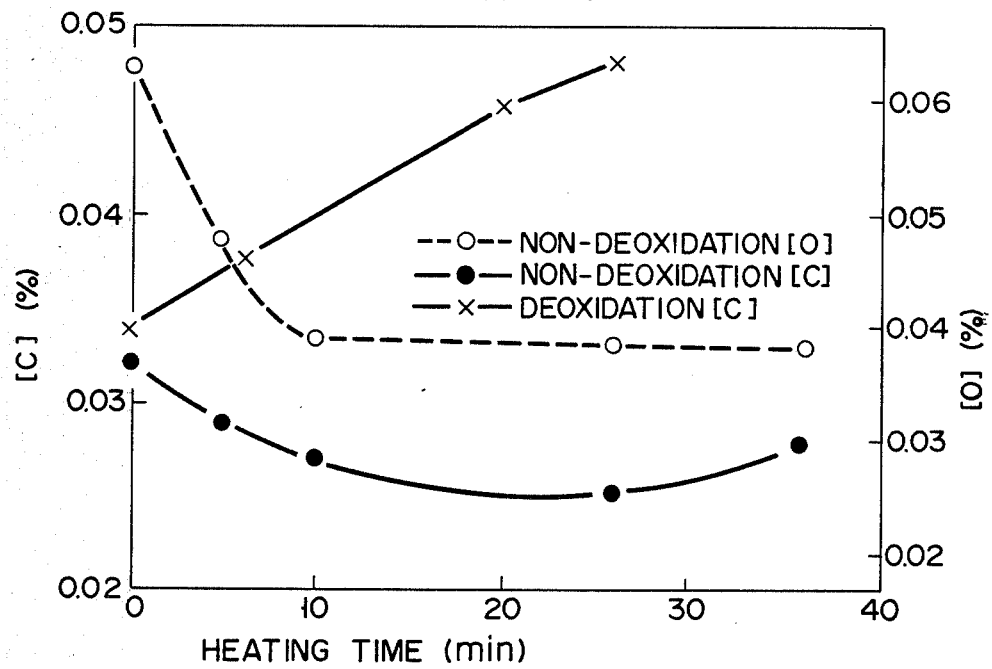
FIG. 4 is a graph for explaining changes in carbon and oxygen contents of molten steel when arc heating is performed.

By arc-heating the nondeoxidized molten steel, an increase in the carbon content [C] of the molten steel during the arc process can be prevented. The reason for this will be described hereafter. FIG. 4 is a graph showing changes in molten steel carbon and oxygen contents, measured by the present invention, when molten steel is arc-heated. The arc heating time is plotted along the abscissa in FIG. 4, and the carbon and oxygen contents [C] and [O] are plotted along the ordinate therein. Small dots and small circles represent changes in carbon and oxygen contents [C] and [O], respectively, when nondeoxidized molten steel is arc-heated. The x mark represents a change in carbon content [C] when Al and Si are added to the molten steel. When deoxidized molten steel is arc-heated in the same manner as in the conventional arc process, carbon from the electrode is picked up by the molten steel and increases the carbon content [C] of the molten steel when the processing time is lengthened. However, according to this embodiment, since nondeoxidized molten steel is arc-heated, the carbon content [C] is decreased when a period of about 20 minutes has elapsed after the arc heating commences. The carbon content [C] will not become higher than before heating even when an additional period of about 40 minutes has elapsed. Further, the oxygen content [O] of deoxidized steel is also decreased. When the oxygen concentration [O] becomes substantially constant, the carbon concentration [C] will increase.

The above phenomenon will be described hereafter. By stirring the molten steel during arc heating, oxygen and carbon react with each other due to the unstable oxygen remaining in the molten steel, so that decarburization and deoxidation occur in accordance with the general formula (2) as follows:

$$C + O \rightarrow CO \uparrow \quad (2).$$

Figure 5:
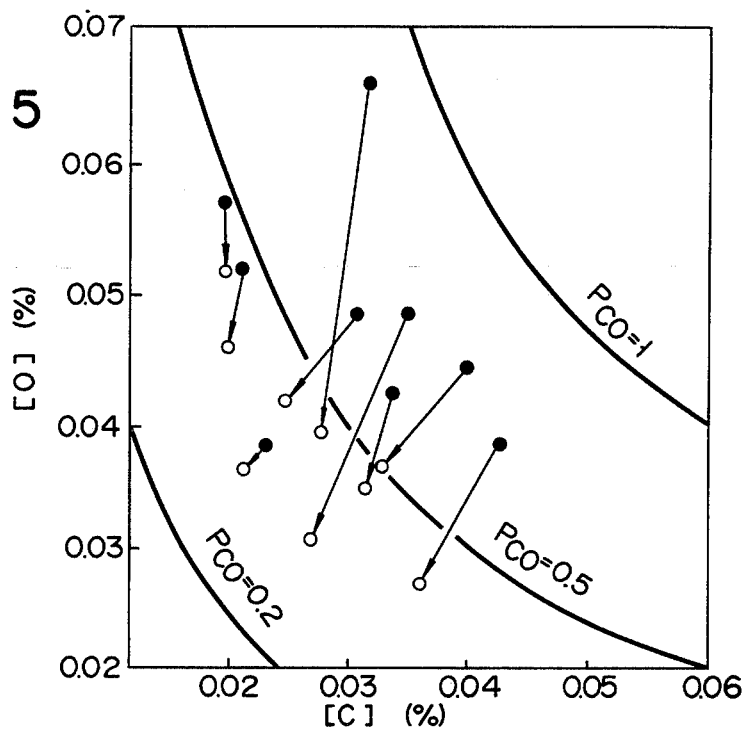
FIG. 5 is a graph for explaining the carbon and oxygen contents [C] and [O] of the molten steel before and after arc heating is completed.

In this case, changes in carbon and oxygen contents [C] and [O] of the molten steel before and after heating are shown in FIG. 5. The carbon content [C] is plotted along the abscissa in FIG. 5, and the oxygen content [O] is plotted along the ordinate therein. The respective curves indicate the relationships between the carbon and oxygen contents [C] and [O] when the CO partial pressures $P_{CO}$ are 1, 0.5 and 0.2 atms, respectively. By arc-heating the nondeoxidized molten steel, the molten steel is decarburized and deoxidized from the state indicated by the small dot before arc heating to the state indicated by the small circle after arc heating.

The CO partial pressure $P_{CO}$ in the above chemical reaction for the molten steel at a temperature of 1,600° C. is expressed by equation (3) as follows:

$$\log(P_{CO}/a_Ca_O) = 1160/T + 2.003 \quad (3).$$

According to equation (3), the reaction represented by the general formula (2) continues by arc heating and stirring until the CO partial pressure $P_{CO}$ becomes 0.4 atm.

When the nondeoxidized molten steel is arc-heated, the residual oxygen and carbon react with each other. Even if carbon of the electrode is picked up by the molten steel, the pickup rate is lower than the decarburization rate. In this manner, by utilizing the residual oxygen in the molten steel, arc heating can be performed for low-carbon steel without increasing the carbon concentration [C] thereof. As shown in FIG. 4, the carbon content [C] is minimized when a period of about 20 to 30 minutes has elapsed. Thereafter, the carbon content [C] will increase. This is because the oxygen content [O] of the molten steel is decreased due to the reaction represented by the general formula (2), and the influence of carbon pickup by the molten steel due to the melting of the electrode is exerted. However, since the arc heating time is generally limited to about 10 minutes, an increase in carbon concentration [C] will not present any problem. In addition, even when a period of about 40 minutes has elapsed after the arc heating has commenced, the carbon concentration [C] will not be higher than before the arc heating commenced.

Figure 6:
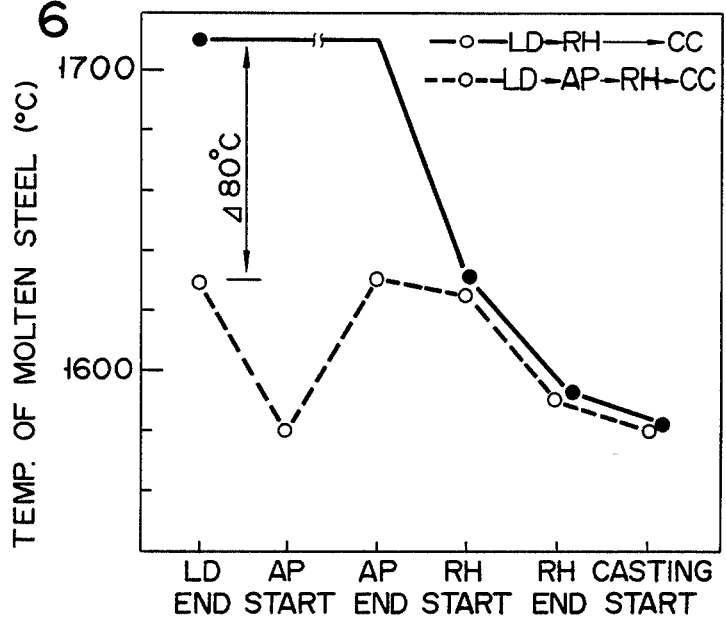
FIG. 6 is a graph for explaining the effect of the present invention.

FIG. 6 shows and compares an example wherein an ultra low carbon steel having a carbon content of not more than 0.015% is produced. The molten steel temperature is plotted along the ordinate in FIG. 6, and the measuring points are plotted along the abscissa therein. These measuring points represent molten steel temperatures at the end of the converter process, the beginning of the arc process (AP), the end of the AP, the beginning of decarburization by the RH process, the end of the RH process, and the beginning of the casting. A small circle represents a case wherein the nondeoxidized molten steel is arc-heated after the molten steel is removed from the converter (LD) to the ladle, and the molten steel is then RH-decarburized and continuously cast. A small dot represents a case wherein the molten steel is removed from the converter and is immediately RD-decarburized and continuously cast. As apparent from FIG. 6, when the arc process is not performed, the molten steel temperature must exceed 1,710° C. when removed from the converter. However, when the arc process is performed, this temperature can be decreased to a temperature of 1,630° C. According to the present invention, an ultra low carbon steel can be produced at this temperature which is lower by about 80° C. than in the conventional case.

Figure 7:
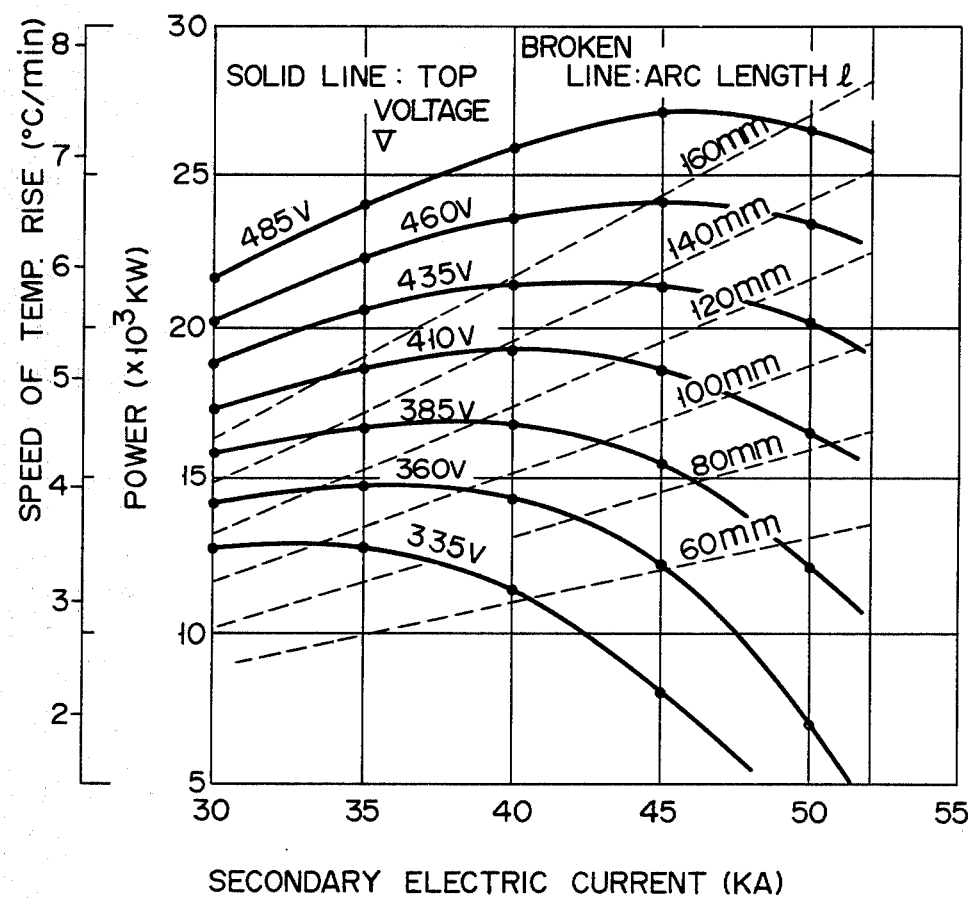
FIG. 7 is a graph for explaining the relationship between the arc voltage, the arc length, the arc current and the heating speed.

The arc heating conditions when the nondeoxidized molten steel is arc-heated will be described. The secondary current is plotted along the abscissa in FIG. 7, and the arc power and the ideal temperature rising speed along the ordinate therein so as to explain the relationship between the tap voltage, the secondary current, the arc length and the temperature rising speed. The ideal temperature rising speed is given as that when arc power is exclusively used to heat the molten steel. The relationship shown in FIG. 7 is obtained such that three carbon electrodes are submerged in the slag on the molten steel, three-phase AC power is supplied from a 40,000-kVA transformer to the electrodes, and arcs are generated between the molten steel and the electrodes. The secondary current plotted along the abscissa represents an arc current between the electrode and the molten steel. The tap voltage represented by the solid line is an output voltge from the transformer. This voltage is the secondary line-to-line voltage applied to the electrodes. The solid line represents the relationship between the temperature rising speed and the secondary current when the tap voltage is predetermined. A dotted line represents the relationship between the temperature rising speed and the secondary current when the arc length, i.e., the distance between the electrode and the molten steel, is predetermined.

As apparent from FIG. 7, when the arc length is predetermined, there are several combinations of the tap voltages and the secondary currents. When the tap voltage and the secondary current are increased, the temperature rising speed of the molten steel increases. In addition, when the tap voltage is constant, the arc length changes in accordance with a change in arc current. In particular, when the tap voltage is high, a combination of the arc length and the secondary current exists to maximize the temperature rising speed.

In the arc process exhibiting such heating characteristics, the heating conditions when extra time can be saved in the arc process must differ from the conditions when no extra time is available due to matching the requirements with the subsequent continuous casting process. The molten steel is heated under optimal conditions within the limits of the operation, and the arc process is effectively performed to improve matching with other processes.

Specifically, after the molten steel is removed from the steel converter, the thickness of the slag on the molten steel 2 in the converter is measured. When a sufficient time margin is available before the continuous casting process commences and after the molten steel is removed from the converter, the arc length l is obtained by subtracting the margin of 50 mm from the slag thickness D, thereby determining the arc length between the electrode and the molten steel. With this arc length, the tap voltage and the secondary current are calculated from FIG. 7 to obtain the maximum temperature rising speed. In other words, the electrodes are brought into contact with the molten steel after the electrodes are moved downward to detect short circuiting between the electrodes and the molten steel. The electrodes are then moved upward so as to be separated from the molten steel by the arc length l. The tap voltage and the secondary current which provide the maximum temperature rising speed at this arc length are applied to generate arcs between the electrodes and the molten steel. For example, when the arc length is 60 mm, a tap voltage of 385 V and a secondary current of 49 kA are required to obtain the maximum temperature rising speed. When the arc length is 80 mm, a tap voltage of 410 V and a secondary current of 51 kA are required to obtain the maximum temperature rising speed. Under these conditions, arcs are generated between the electrodes and the molten steel to heat the molten steel.

When, however, a sufficient time margin is not available for the arc process after the molten steel is removed from the converter and before the continuous casting process is started, the desired temperature rising speed of the molten steel during the arc process must be determined in accordance with the allowable process time and the target heating temperature. Among possible heating conditions for obtaining the desired temperature rising speed, the optimal conditions are selected to provide a minimum thickness of the slag layer. For example, when the desired heating speed is 5° C./min, the slag thickness is about 110 mm, the tap voltage is 410 V and the secondary current is 46 kA, as apparent from FIG. 7. When the thickness of the slag layer on the molten steel in the converter is, for example, 100 mm, enough flux is added to obtain a slag layer of about 60 mm in thickness, obtained by adding the margin of 50 mm and the 10 mm shortage, and the above tap voltage and secondary current are used to generate arcs between the electrodes and the molten steel. The added flux is melted by these arcs, and the molten steel is heated. In the above heating conditions wherein the slag thickness is minimized, energy required for heating the added flux could be minimized.

When the time margin is sufficient, the tap voltage and the secondary current are set to obtain the arc length determined by the slag thickness. In this case, the process time becomes relatively long, but the consumption of flux can be decreased and the power used to heat the flux can be decreased, resulting in low cost. Even in this case, a tap voltage and a secondary current can be selected to obtain a maximum temperature rising speed for a given slag thickness to minimize the process time.

When the time margin is not sufficient, the heating conditions are selected in accordance with the temperature rising speed. Even in this case, a tap voltage and a secondary current can be selected to minimize the amount of flux added to the molten steel so as to minimize the consumptions of flux and the power.

Even in the case wherein the time margin is sufficient, a desulfurizing flux may be added to the molten steel poured into the ladle when desulfurization is performed in the arc process. In this case, after the slag is removed by a vacuum suction method from the converter, the desulfurizing flux is preferably added to the molten steel. This is because the converter slag has low desulfurizing efficiency.

The heating conditions are determined by the process cost or the temperature rising speed in accordance with the available time margin during the arc process. The molten steel can be arc-heated at low cost when arc heating matches with other processes.

Figure 8:
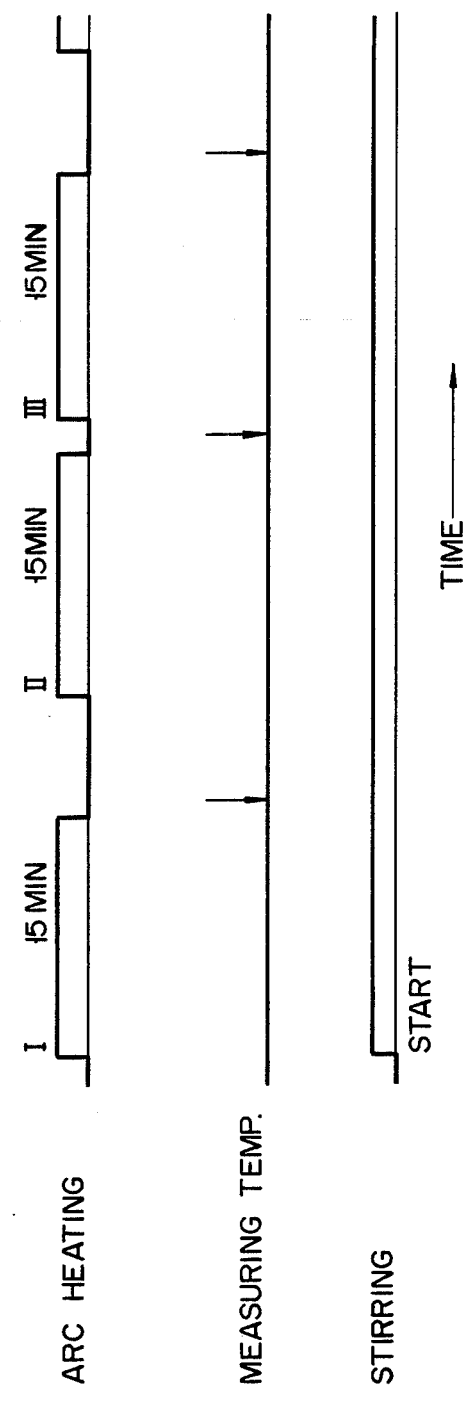
FIG. 8 is a timing chart for explaining the respective operations when arc heating is performed.
Figure 9:
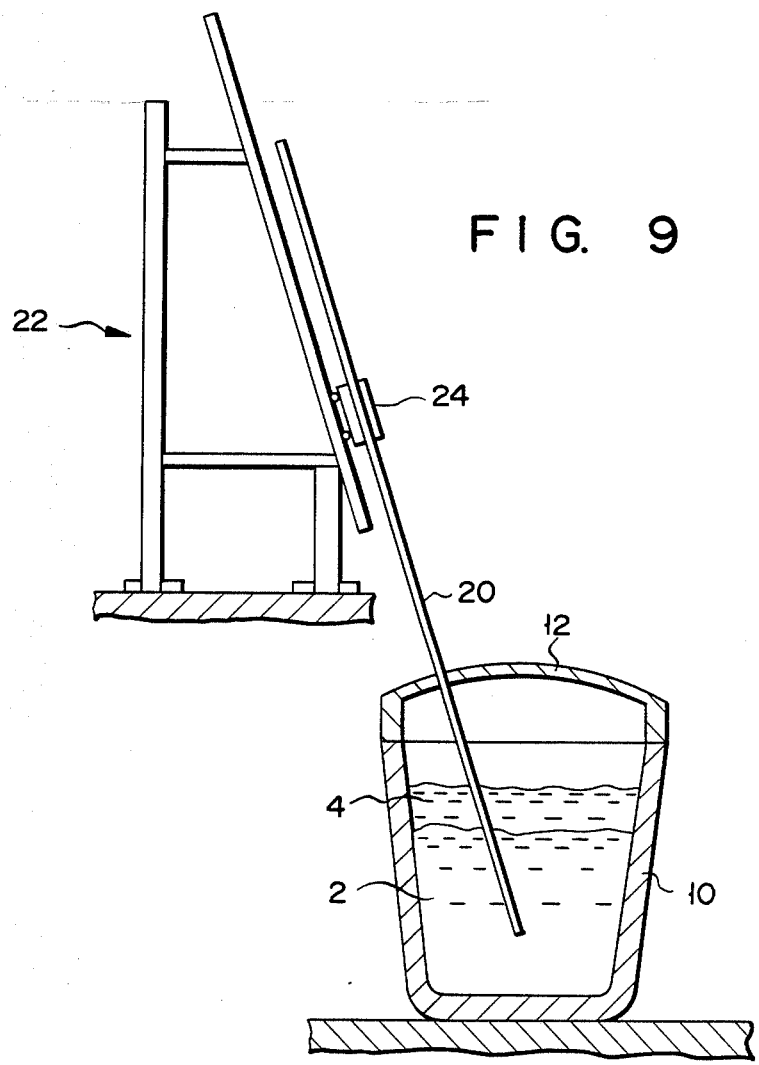
FIG. 9 is a longitudinal sectional view of a measuring apparatus for measuring a temperature difference between the slag and the molten steel.

The molten steel and the slag are stirred with the gas by means of the lance 16 while the molten steel is arc-heated. Therefore, the refractory material of the ladle will not be damaged since the slag is kept at a low temperature. However, it is preferable that the slag temperature be measured during arc heating to prevent the slag from being heated to an abnormally high temperature. FIG. 8 is a timing chart for explaining the respective operations in arc heating. The argon gas is introduced into the molten steel through the lance 16 to moderately stir the molten steel. At the same time, the electrodes 14 are powered. When a period of 15 minutes has elapsed after the arc heating commences, the electrodes 14 are deenergized. Thereafter, the electrodes and the lance are moved upward above the ladle, and the temperatures of the molten steel and the slag are measured, as shown in FIG. 9. The electrodes and the lance are not illustrated in FIG. 9.

A thermocouple 20 as a temperature measuring probe is supported by a carrier member 24 on a lift device 22. The carrier member 24 is moved downward to insert the thermocouple 20 into the ladle through the cover 12. The thermocouple 20 is then submerged in the molten steel 2 in the ladle 10. A paper sleeve is formed on the upper portion of the thermocouple 20, which is protected from heat radiated from the molten steel. An iron cap is mounted on the temperature measuring lower end. When the thermocouple 20 is moved downward, the temperature measuring portion passes through the slag and is submerged in the molten steel. The submerging depth is, for example, 400 mm. Since the temperature measuring portion is protected by the iron cap, that portion is free from wire disconnection and contamination. When the temperature measuring portion of the thermocouple is submerged in the molten steel, the iron cap is melted by the heat of the molten steel, and the temperature measuring portion is exposed to start measuring the temperature. When the temperature measurement of the molten steel is started, the carrier 24 is moved upward to raise the thermocouple 20 while the measured results are being recorded on a chart.

Figure 10:
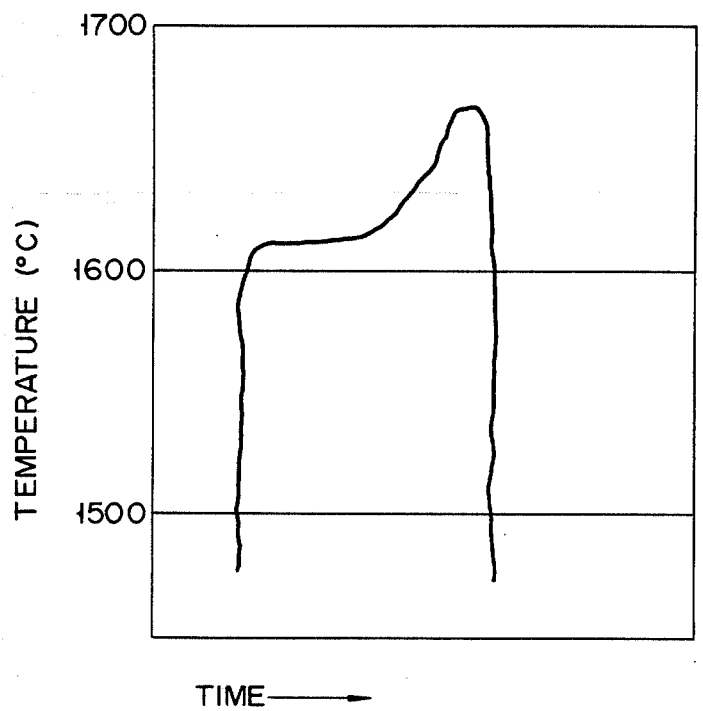
FIG. 10 is a chart showing the measured results of the apparatus shown in FIG. 9.

As shown in the chart of the thermocouple 20 in FIG. 10, the initial temperature of the molten steel 2 measured by the thermocouple 20 is 1,610° C. However, when the temperature measuring portion enters into the slag 4, the temperature is increased to a maximum temperature of 1,670° C. Thus, the slag temperature is 1,670° C. by analyzing the recorded chart, a temperature difference between the slag and the molten steel can be detected. The lift speed of the thermocouple is preferably not more than 1 m/min (e.g., 0.9 m/min) so as to guarantee the precision of the temperature difference measurement.

When the temperature difference is not less than 50° C., gas is continuously introduced into the molten steel to continuously stir the slag and the molten steel, thereby decreasing the temperature of the slag, as shown in FIG. 8. The arc heating is stopped, and the molten steel is stirred for a predetermined period (e.g., 4 minutes) thereafter so as to decrease the temperature of the slag. Thereafter, as shown in FIG. 8, arc heating for the second step (II) is performed for 15 minutes. When the period of 15 minutes has elapsed, the temperatures of the molten steel and the slag are measured again. The reason arc heating is interrupted for 15 minutes and the temperatures of the molten steel and the slag are measured is that the temperature difference falls within the range of 50° C. within 15 minutes in arc heating. The reason arc heating and stirring of the molten steel are controlled such that the temperature difference therebetween does not become more than 50° C. is that the refractory material of the ladle is damaged and greatly worn at a slag temperature 50° C. higher than the molten steel temperature of 1,600° to 1,650° C.

When the temperature difference is not more than 50° C., arc heating is immediately started, as indicated by the third step (III) in FIG. 8, after the temperature measurement. In this manner, arc heating and temperature measurement are alternately repeated, so that the molten steel and the slag can be stirred to prevent overheat of the slag and achieve heating of the molten steel to a predetermined temperature.

The arc heating time and the temperature difference are not limited to 15 minutes and 50° C., respectively, but can be modified in accordance with the type of steel and arc heating conditions. In addition, the gas stirring time can also be changed as needed and be of a sufficient length to decrease the temperature difference between the slag and the molten steel. Furthermore, when only stirring is performed, the flow rate of the inert gas introduced into the molten steel can be increased to vigorously stir the molten steel instead of moderately stirring it.

In this manner, the slag will not be overheated, and the molten steel can be properly arc-heated. Therefore, damage to and wear of the refractory material of the ladle can be greatly decreased, thereby arc-discharging the molten steel at low cost.

Figure 11:
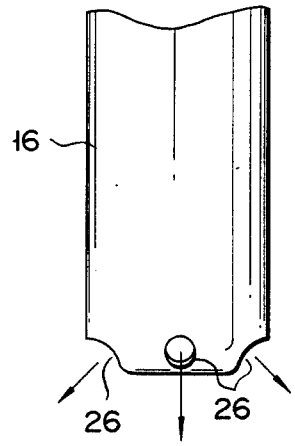
FIGS. 11 and 12 are side views showing blow ports of different types of lances.
Figure 12:
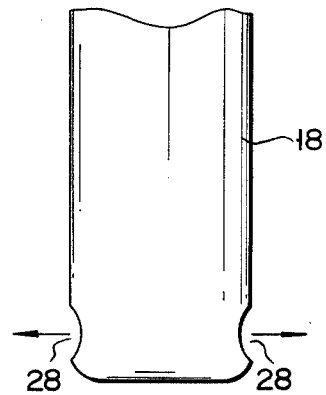

When the gas is introduced into the molten steel through the lance to stir the molten steel, the molten steel must be stirred so as not to bring the electrodes into contact with the molten steel while arc heating is being performed. After arc heating is completed, the molten steel is preferably vigorously stirred. A lance suitable for gas blowing will now be described. FIGS. 11 and 12 show different types of lances 16 and 18. As shown in FIG. 11, four blow ports 26 are formed at the lower end portion of the lance 16. The diameter of the blow port 26 is, for example, 8 mm. The gas is blown at an angle of 45 degrees with respect to the longitudinal direction of the lance 16 so as to radially extend downward in four directions. The lance 16 is inserted at a slightly inclined angle in the ladle 10, as shown in FIG. 3. The lower portion of the lance 16 is submerged in the molten steel 2. The gas blow ports of the lance 16 are deviated by about 900 mm from the center of the ladle 10 and are located at a position spaced 800 mm from the lower end of the ladle 10. The lance is actually inclined at an angle of 8.8 degrees with respect to the vertical direction.

The vigorously stirring lance 18 comprises a cylindrical member, and two blow ports 28 are formed at the lower end portion thereof. Each blow port 28 has a diameter of about 10 mm. The gas is blown from the blow ports 28 in opposing directions perpendicular to the longitudinal direction of the lance 18. After the electrodes 14 are removed from the ladle 10, the lance 18 is located at a radially central portion of the ladle 10, which is spaced 800 mm from the bottom of the ladle 10. The lance 18 is inclined at an angle of about 16 degrees with respect to the vertical direction.

When the arc process is performed using these lances, argon gas is supplied to the molten steel at a flow rate of 400 to 500 Nl/min through the lance 16 submerged in the molten steel 2 while arc heating is conducted. Thus, the temperature of the molten steel and the slag is rendered uniform. When the slag has the optimal composition for desulfurization, the molten steel is mixed by being stirred with the slag. The molten steel reacts with the slag and is desulfurized.

Figure 13:
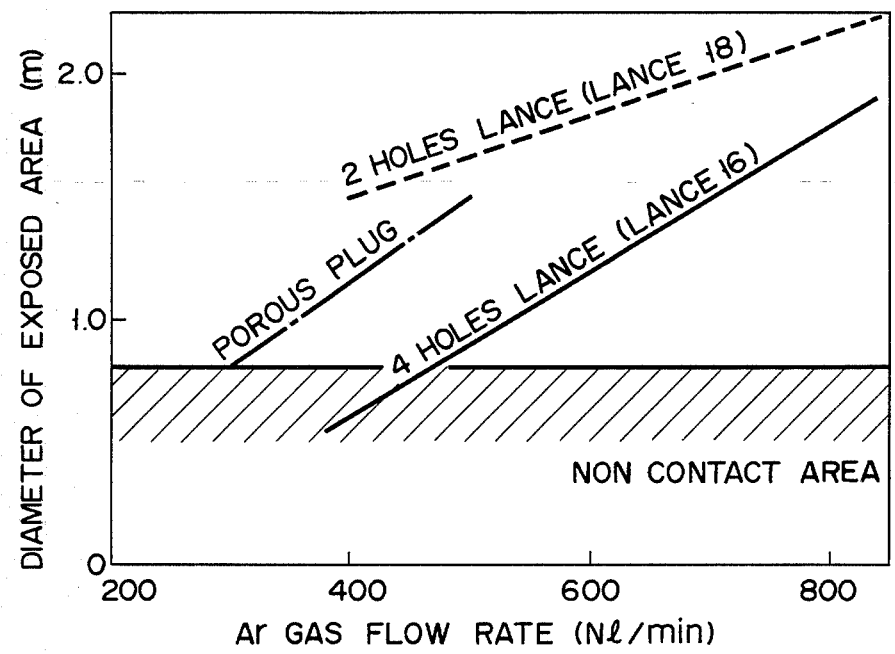
FIG. 13 is a graph for explaining the relationship between the Ar gas flow rate and the molten steel exposure region.

FIG. 13 is a graph showing the relationship between the flow rate of argon gas and the region exposed to molten steel. The ladle 10 has a volume of 250 tons. The region exposed to molten steel is obtained such that argon gas is introduced into the molten steel, and the slag is partially removed from the surface of the molten steel since the molten steel is undulated by stirring. When the exposed region is large, the surface of the molten steel markedly undulates. However, when the exposed region is small, the surface of the molten steel slightly undulates. The solid line in FIG. 13 represents a case wherein the lance 16 has four blow ports for blowing the inert gas at an inclined angle of 45 degrees with respect to the longitudinal direction of the lance 16. The dotted line in FIG. 13 represents the case for the two-port T-shaped lance 18 shown in FIG. 12. As a comparison, gas is blown into the molten steel from the bottom of the ladle 10 by using a porous plug, as indicated by the alternate long and short dashed line. The hatched portion indicates an area wherein the electrodes will not be brought into contact with the molten steel even if the molten steel is stirred by the gas. As apparent from the graph in FIG. 13, the surface of the molten steel slightly undulates for the lance 16 although the flow rate of argon gas is relatively high. Therefore, the lance 16 is suitable for supplying gas when the electrodes are submerged in the slag. When the flow rate of argon gas is not more than 500 Nl/min and the lance 16 is used, the electrodes will not be brought into contact with the molten steel. Therefore, the lance 16 shown in FIG. 11 is used to stir the molten steel 2 while the electrodes 14 are submerged in the slag during arc heating. At this time, the argon gas is blown into the molten steel at a maximum flow rate of 400 to 500 Nl/min (1.6 to 2 Nl/min per ton of molten steel).

When an alloy is added to the molten steel, it is preferable to blow argon gas into the molten steel at a flow rate of 600 to 800 Nl/min (2.4 to 3.2 Nl/min per ton of molten steel) through the lance 16 to obtain an exposed area having a diameter of 1 to 1.8 m so as to add an alloy to the molten steel without the alloy being brought into contact with the slag.

Arc heating is stopped after the molten steel 2 is heated to a predetermined temperature. The electrodes 14 and the lance 16 are removed from the ladle 10. The vigorously stirring lance 18 is submerged into the molten steel, as indicated by the alternate long and short dashed line in FIG. 3. Argon gas is blown in the molten steel at a flow rate of 1,000 Nl/min (4 Nl/min per ton of molten steel) through the lance 18 to vigorously stir the molten steel 2 and the slag 4. As apparent from FIG. 13, the lance 18 provides a larger exposed area than that of the lance 16 although the same flow rate of argon gas is given, so that the molten steel is vigorously stirred by the lance 18. The molten steel 2 is uniformly stirred and is kept at a predetermined temperature. In addition, a uniform composition of the molten steel can also be obtained. When the slag has a composition suitable for desulfurization, the molten steel 2 and the slag 4 are stirred to accelerate desulfurization.

In this manner, when the electrodes are submerged in the slag while the molten steel is arc-heated, the gas is introduced into the molten steel through the lance 16 having four ports through which the gas is blown at a 45 degree angle with respect to the longitudinal direction of the lance 16. Therefore, even if the gas is blown in the molten steel at a relatively high flow rate, the surface of the molten steel will not undulate greatly. The molten steel can be stirred while it is arc-heated without causing the electrodes to come into contact with the molten steel. However, when the molten steel is vigorously stirred, the gas is blown into the molten steel by using the two-port T-shaped lance 18. In this case, the surface of the molten steel undulates greatly, so that the molten steel can be effectively stirred with the slag. In particular, when the molten steel is being desulfurized, the desulfurization efficiency can be increased.

Figure 14:
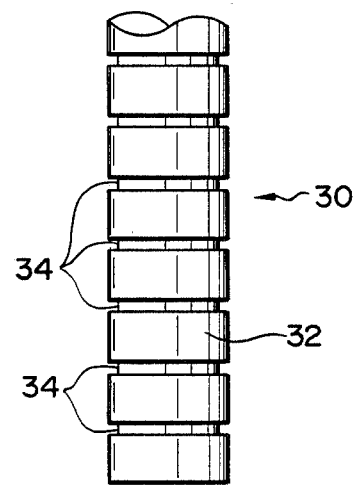
FIGS. 14 and 15 are respectively a side view and a sectional view for explaining the steps of manufacturing the electrode.
Figure 15:
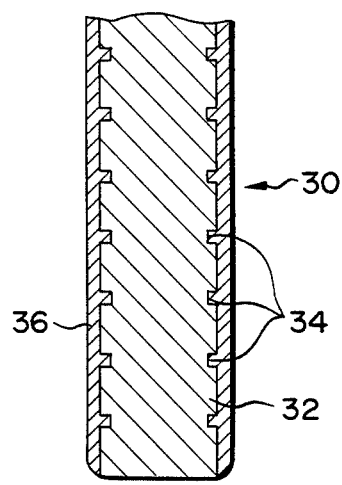
Figure 16:
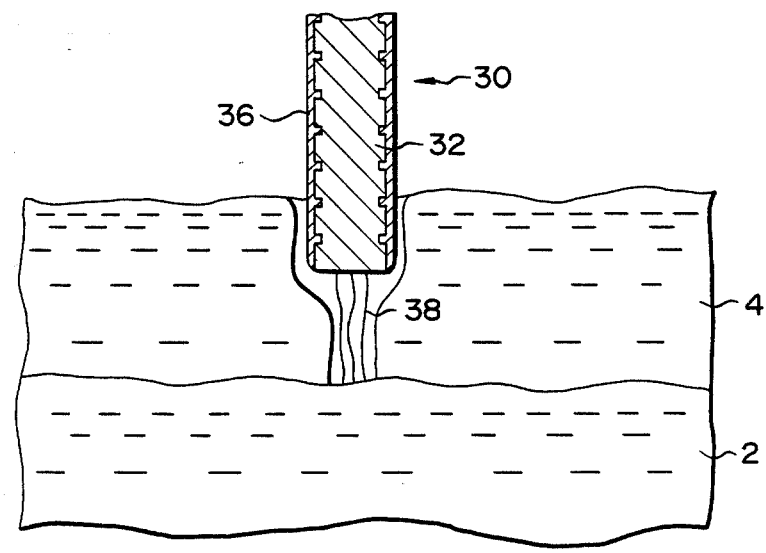
FIG. 16 is a sectional view showing a state wherein the electrode is actually used.

An electrode to minimize the molten steel pick up of carbon during the arc process will be described with reference to FIGS. 14 to 16. FIGS. 14 and 15 show the manufacturing steps of an electrode 30, and FIG. 16 shows an actual application of the electrode 30. As shown in FIG. 14, the electrode 30 comprises a carbon column 32. A plurality of annular groove 34 are formed on the outer surface of the carbon column 32 at equal intervals. A refractory coating 36 is formed on the outer surface of the carbon column and comprises a refractory material such as zirconia ($ZrO_2$) or magnesia (MgO). By means of the grooves 34, the coating 36 will not be removed or peeled from the surface of the carbon column 32.

When molten steel 2 is arc-heated by using the electrode 30, arcs 38 are formed between the lower end face of the electrode 30 and the molten steel 2, as shown in FIG. 16. Since the outer surface of the carbon column 32 is covered with the coating 36, arcs will not be generated from the outer surface. As a result, the carbon column 32 of the electrode 30 will rarely be brought into contact with the molten steel 2 and the slag 4. Therefore, the electrode 30 is rarely melted or damaged. In addition, since the carbon column 32 is coated with the coating 36, the outer surface of the carbon column 32 will not be substantially oxidized. The electrode 30 maintains its columnar shape. Therefore, the column of the arc 38 is stabilized, and the electrode 30 will not vertically move upon application of the predetermined tap voltage and secondary current, thereby further preventing damage to the electrode 30 due to heat from the molten steel 2. An increase in the carbon content [C] of the molten steel in arc heating can be prevented, and the life of the electrode is prolonged.

Figure 17:
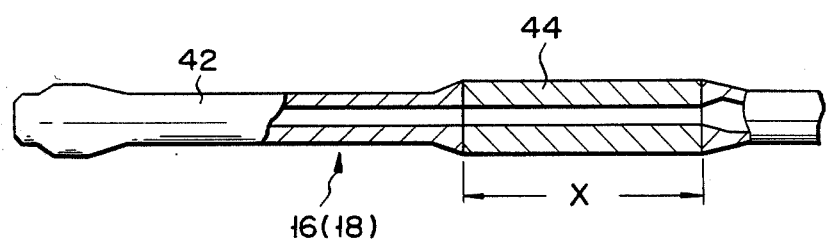
FIG. 17 is a partial sectional view of a lance.

Portions of the lances 16 and 18 which are located in the slag 4 are easily damaged compared with the portions thereof located in the molten steel 2. This is because the slag 4 is kept at a higher temperature than the molten steel 2 and an iron oxide (FeO) component in the slag easily corrodes the refractory material. In order to prevent damage to the lance placed in the slag line, the slag line comprises a refractory material rich in alumina ($Al_2O_3$) content having a high refractory property. For further minimizing damage in the slag line, the lance 16 or 18 may be vertically moved. As shown in FIG. 17, each lance 16 or 18 comprises a portion 42 subject to submerging in the molten steel 2 and an upper portion 44 having a length X. The portion 44 is thicker than the portion 42 in order to reduce the adverse effect of damage caused by the slag. When the thickness of the slag layer 4 is 120 mm, the length X is given as about 1,200 mm.

The lances 16 and 18 are continuously or intermittently moved. For example, the portion 44 is divided into three regions. Each lance 16 or 18 is moved such that one of three regions is brought into contact with the slag during every predetermined period of arc heating. The lances 16 and 18 are continuously moved such that the portions brought into contact with the slag continuously change within the divided regions of portion 44 for every charge or heat.

As a result, damage within the portion 44 can become uniform, and the life of the lances 16 and 18 can be prolonged. For example, the life can be prolonged for 10 charges as compared with a life of 6 charges when the lance is not vertically moved during arc discharge.

What is claimed is:

1. A method of refining molten steel by an arc process, comprising the steps of:
    flowing molten steel refined by oxidation and having a certain oxygen and carbon content into a ladle at a temperature not higher than 1,650° C.;
    submerging an electrode in slag on the nondeoxidized molten steel;
    generating an arc between the electrode and the molten steel to arc-heat the molten steel;
    introducing a gas which does not react with the molten steel through a lance submerged therein during said arc-heating step, thereby stirring the molten steel and accelerating a chemical reaction between the oxygen and carbon contained in the molten steel; and
    avoiding contact between the molten steel and the electrode by controlling the flow of gas through and out of the lance.

2. A method according to claim 1, further comprising the steps of introducing a gas which does not react with the molten steel through an auxiliary lance submerged therein after said arc-heating step is completed, thereby further stirring the molten steel, and causing the slag also to be stirred by controlling the flow of gas through and out of the auxiliary lance.

3. A method according to claim 2, including introducing argon gas from said lance and said auxiliary lance into the molten steel.

4. A method according to claim 1, wherein a relationship between an arc voltage, an arc length, an arc current and a temperature rising speed of the molten steel is obtained, and further comprising the steps of
    measuring the thickness of the slag on the molten steel poured in the ladle and
    selecting one of
        a first heating condition in which an arc voltage for forming a predetermined arc length determined by the measured slag thickness is obtained in accordance with the relationship and generating the arc with the arc voltage derived from the relationship, and
        a second heating condition in which an arc voltage, an arc current and a slag thickness which are required to heat the molten steel at a desired heating rate are obtained in accordance with the relationship, adding a flux to the molten steel in an amount to obtain the slag thickness obtained by subtracting the measured slag thickness from the slag thickness derived from the relationship, and generating an arc at the arc voltage and current derived from the relationship.

5. A method according to claim 4, including selecting the first heating condition when arc heating is performed with a sufficient time margin, and selecting the second heating condition when the arc heating time is predetermined, and the desired heating rate is determined in accordance with a temperature to be increased by arc heating and the time to be used for arc heating.

6. A method according to claim 1, wherein the step of stirring the molten steel is continuously performed, and the step of arc-heating the molten steel is intermittently performed for every predetermined time interval, and further comprising the step of measuring the temperature difference between the slag and the molten steel after the step of arc-heating the molten steel is completed, arc heating being performed after a predetermined time interval has elapsed when the temperature difference between the slag and the molten steel exceeds a predetermined temperature difference, and arc heating being immediately performed when the temperature difference is smaller than the predetermined temperature difference.

7. A method according to claim 6, wherein arc heating is performed for every 15 minutes.

8. A method according to claim 7, wherein the predetermined temperature difference is 50° C.

9. A method according to claim 8, wherein the step of measuring the temperature difference between the slag and the molten steel is performed by submerging a temperature sensor in the molten steel to measure a molten steel temperature, and the slag temperature is measured by measuring a maximum detection temperature from the temperature sensor while upwardly moving the temperature sensor.

10. A method according to claim 2, including forming said lance as a cylindrical member having four gas blow ports which are inclined at an angle of about 45 degrees with respect to a longitudinal direction thereof and which radially extend from a lower end portion of said cylindrical member toward four different directions.

11. A method according to claim 10, including controlling the flow rate of the gas introduced from said lance to the molten steel at 1.6 to 2 Nl/min per ton of the molten steel.

12. A method according to claim 11, including forming the auxiliary lance as a cylindrical member and having two blow ports which are formed at a lower end portion of said cylindrical member and which blow the gas along opposing directions perpendicular to the longitudinal direction of the cylindrical member.

13. A method according to claim 12, including controlling the flow rate of the gas introduced from said auxiliary lance into the molten steel to be not less than 4 Nl/min per ton of the molten steel.

14. A method according to claim 1, including forming the electrodes as round carbon rods, respectively.

15. A method according to claim 1, including forming each of the electrodes as a carbon column and providing a refractory coating on an outer surface portion of the carbon column which is directly brought into contact with the slag.

16. A method according to claim 15, including forming the electrode with a plurality of annular grooves on the outer surface of the carbon column at equal intervals, and forming the coating to bury the annular grooves.

17. A method according to claim 16, including forming the coating of a refractory material selected from the group comprising zirconia and magnesia.

* * * * *